US011222476B2

(12) United States Patent
Lambert et al.

(10) Patent No.: US 11,222,476 B2
(45) Date of Patent: Jan. 11, 2022

(54) SYSTEM TO ADD PARALLAX TO VIDEO FOR AUGMENTED REALITY HEAD UP DISPLAY

(71) Applicant: Panasonic Automotive Systems Company of America, Division of Panasonic Corporation of North America, Peachtree City, GA (US)

(72) Inventors: David Kay Lambert, Sterling Heights, MI (US); Derek Louis Didier, Fayetteville, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 16/925,873

(22) Filed: Jul. 10, 2020

(65) Prior Publication Data

US 2020/0388079 A1  Dec. 10, 2020

Related U.S. Application Data

(60) Provisional application No. 62/847,537, filed on May 14, 2019.

(51) Int. Cl.
*G06T 19/00* (2011.01)
*H04N 13/128* (2018.01)
*H04N 13/383* (2018.01)

(52) U.S. Cl.
CPC ......... *G06T 19/006* (2013.01); *H04N 13/128* (2018.05); *H04N 13/383* (2018.05)

(58) Field of Classification Search
None
See application file for complete search history.

(56) References Cited

U.S. PATENT DOCUMENTS

| | | | | |
|---|---|---|---|---|
| 9,939,637 | B2 * | 4/2018 | Kasano | G02B 27/0101 |
| 2003/0169213 | A1 * | 9/2003 | Spero | G02B 27/0093 |
| | | | | 345/7 |
| 2011/0187844 | A1 * | 8/2011 | Ogawa | G02B 27/01 |
| | | | | 348/78 |
| 2016/0313562 | A1 * | 10/2016 | Saisho | G02B 27/0179 |
| 2016/0327790 | A1 * | 11/2016 | Kasano | H04N 13/344 |
| 2018/0211635 | A1 * | 7/2018 | Ishibashi | G02B 27/0101 |
| 2019/0107886 | A1 * | 4/2019 | Saisho | G01C 21/3697 |
| 2019/0137294 | A1 * | 5/2019 | Jung | G06F 16/29 |
| 2020/0150431 | A1 * | 5/2020 | Kusafuka | G02B 30/30 |
| 2020/0288076 | A1 * | 9/2020 | Kozuka | H04N 5/378 |
| 2020/0353816 | A1 * | 11/2020 | Hirata | H04N 9/3147 |

* cited by examiner

*Primary Examiner* — Ryan M Gray
(74) *Attorney, Agent, or Firm* — Laurence S. Roach, Esq.

(57) ABSTRACT

A head up display arrangement for a motor vehicle includes a source of a first video signal. A driver monitor system detects a location of at least a portion of a human driver of the motor vehicle. An electronic processor is communicatively coupled to the first video signal source and to the driver monitor system. The electronic processor produces a second video signal that is dependent upon the first video signal and that includes parallax information. The parallax information is based on the detected location of the portion of the driver. A head up display projection device produces a virtual image that is visible to the driver and that is based upon the second video signal.

20 Claims, 6 Drawing Sheets

SYSTEM TO ADD PARALLAX TO VIDEO FOR AUGMENTED REALITY HEAD UP DISPLAY

CROSS-REFERENCED TO RELATED APPLICATIONS

This application claims benefit of U.S. Provisional Application No. 62/847,537 filed on May 14, 2019, the disclosure of which is hereby incorporated by reference in its entirety for all purposes.

BACKGROUND OF THE INVENTION

1. Field of the Invention

The present invention relates to a head up display (HUD) system in a motor vehicle.

2. Description of the Related Art

A head up display emits light that reflects off of one or more mirrors and from the front windshield to be seen by the driver. The light appears to come from a virtual image in front of the driver and in front of the windshield. This type of head up display is currently commercially available.

Conventional head up displays create the virtual image by first using a display to create an image. Next, the light from the image is reflected from one or more mirrors. Next, the light from the mirrors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

SUMMARY OF THE INVENTION

The invention may provide a means to position graphics to be viewed in an augmented reality (AR) head up display so the driver has the perception of parallax of the virtual objects, even though the input video does not include the effect of parallax. If the HUD is provided with the distance from the driver to the virtual object, the image can be corrected for parallax. The HUD does not need this information for each individual point. The HUD may divide the field of view into zones, similar to what is done with local dimming of the backlight, and apply the parallax shift individually to each zone. This calls for the vehicle video control unit (VCU) to send the distance for each zone. The number of zones may be small enough that the processing demands are reasonable. For example, if the field of view were divided into a 6×8 matrix of 48 zones, the effect may be acceptable from a human factors point of view. To implement this, the VCU would need to send only 48 distances with each video frame, which would be reasonable for the HUD to implement.

The invention comprises, in one form thereof, a head up display arrangement for a motor vehicle, including a source of a first video signal. A driver monitor system detects a location of at least a portion of a human driver of the motor vehicle. An electronic processor is communicatively coupled to the first video signal source and to the driver monitor system. The electronic processor produces a second video signal that is dependent upon the first video signal and that includes parallax information. The parallax information is based on the detected location of the portion of the driver. A head up display projection device produces a virtual image that is visible to the driver and that is based upon the second video signal.

The invention comprises, in another form thereof, a method for presenting visual information to a human driver in a motor vehicle. A first video signal is transmitted. A location of at least a portion of the human driver of the motor vehicle is detected. A second video signal that is dependent upon the first video signal and that includes parallax information is transmitted. The parallax information is based on the detected location of the portion of the driver. A virtual image that is visible to the driver and that is based upon the second video signal is produced.

The invention comprises, in yet another form thereof, a head up display arrangement for a motor vehicle, including a source of a first video signal. A driver monitor system emits infrared energy through a dichroic mirror such that the infrared energy is reflected off of a human driver of the motor vehicle. The driver monitor system receives the reflected infrared energy after the infrared energy is reflected off of a human driver. The driver monitor system detects a location of at least a portion of a human driver of the motor vehicle based upon the received infrared energy. An electronic processor is communicatively coupled to the first video signal source and to the driver monitor system. The electronic processor produces a second video signal that is dependent upon the first video signal and that includes parallax information. The parallax information is based on the detected location of the portion of the driver. A head up display projection device emits a light field that is reflected off of the dichroic mirror to thereby produce a virtual image that is visible to the driver and that is based upon the second video signal.

An advantage of the invention is that it makes it possible for an augmented reality HUD to correctly provide the perception of parallax to the driver even though eye position information is not provided to the vehicle video control unit.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
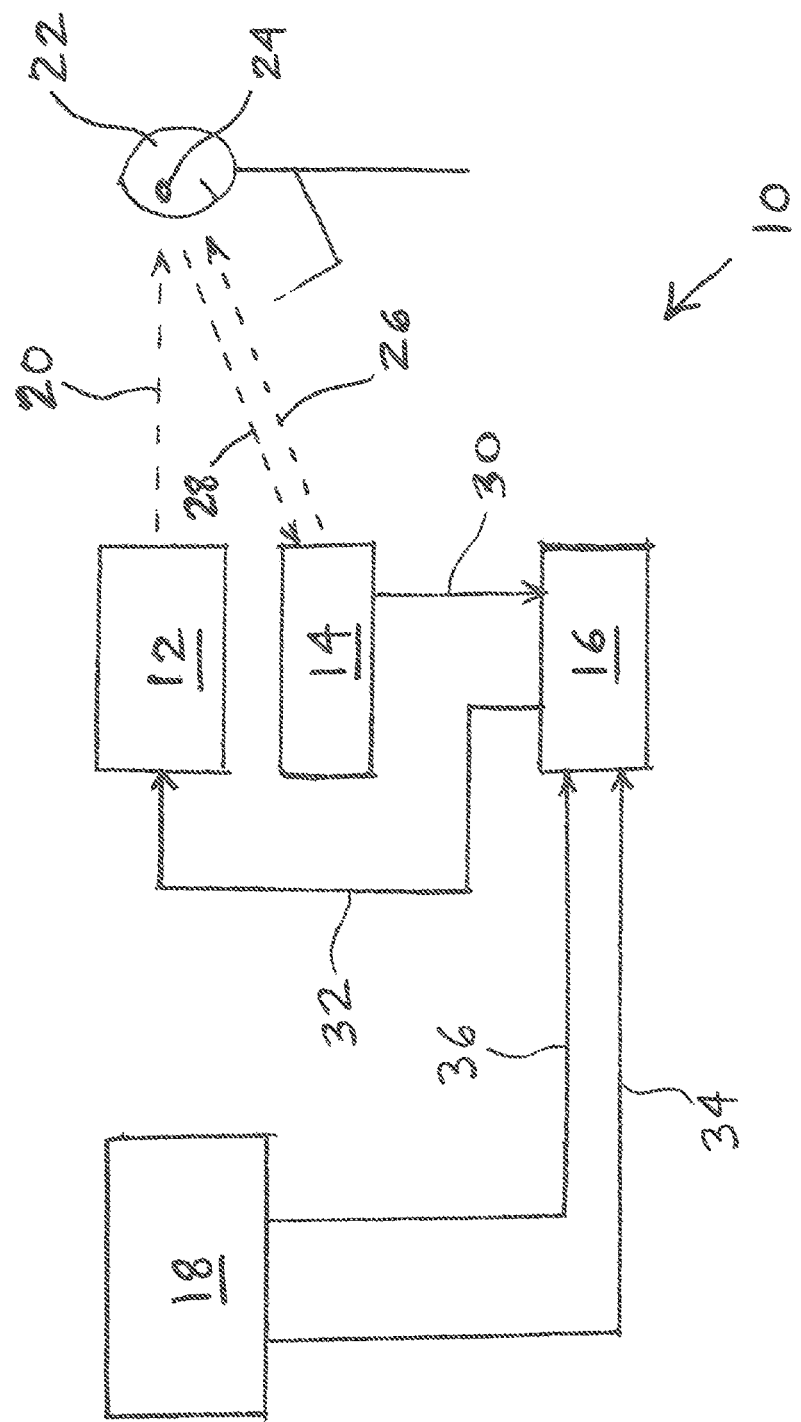
FIG. 1 is a block diagram of one embodiment of an AR HUD system of the present invention.

FIG. 1 illustrates one embodiment of an AR HUD system 10 of the present invention including a projector 12, a driver monitor system 14, an electronic processor 16, and a video signal source in the form of vehicle video control unit (VCU) 18. Projector 12 emits visible light 20 which may be seen by a human driver 22 as a virtual image with augmented reality.

Driver monitor system 14 may determine the position of the driver's eye point. That is, driver monitor system 14 may determine the position or location of one or both eyes 24 of driver 22 in three-dimensional space. In order to accomplish this, driver monitor system 14 may provide infrared illumination 26, and receive infrared energy 28 that has been reflected off of driver 22.

As indicated at 30, processor 16 may receive from driver monitor system 14 information indicating the location of one or both eyes 24 of driver 22 in three-dimensional space. Based on the location of one or both eyes 24, processor 16 may include or add parallax information in a video signal 32 that is transmitted to projector 12.

Vehicle video control unit 18 may transmit a video stream or signal 34 of graphics without parallax to processor 16. Vehicle video control unit 18 may transmit another signal 36 indicating the perceived distance between driver 22 and virtual objects in a sequence of zones in the driver's field of view.

The graphics to be shown may be created within video control unit 18. VCU 18 may send the graphics as an input video stream to the HUD, including projector 12 and processor 16. The input video stream to the HUD does not include the effect of parallax. Packaged with the HUD is driver monitor system (DMS) 14 which determines a point in space characteristic of the location of the driver's eyes 24. According to one embodiment of the invention, the field of view of the HUD is divided into zones, and VCU 18 also sends to the HUD a stream of information, by zones, of average distance from the driver to the virtual objects in that zone.

The AR HUD may input video (without parallax) from the vehicle video control unit 18 together with an information stream including the distances to virtual objects in each of a sequence of zones in the virtual image. The AR HUD may also output a projected image to be seen by the driver as augmented reality with parallax. The location of a point characteristic of the driver's eyes is obtained using driver monitor system 14, which illuminates the driver's face with infrared energy and which images the infrared energy reflected off of the driver's face. Processor 16 combines the video signal from the vehicle VCU 18, the distance information to the virtual object, and the driver's eye point to provide a video stream to projector 12 that includes parallax.

For zones in which there is no graphical content, a default value is provided in the stream. For each zone, the HUD calculates the displacement of the graphics based on driver eye position, distance to the virtual object, and the virtual image distance. As an example, the graphical content is translated accordingly before the graphical content is displayed. As an example, in a particular zone, the virtual image is translated from 2D position d to position d' where:

$$d'=d(OD-VID)/OD.$$

wherein OD is the distance from the driver to the virtual object, and VID is the distance from the driver to the virtual image. The origin of d is chosen so that with d=0, points in the virtual image are aligned with corresponding points in the real world. Each point in the virtual image has a corresponding pixel in the display that illuminates that point. To express the function of this invention in terms of individual pixels on the HUD display, it is necessary to take the mapping from the HUD display to the virtual image into account, as is known to the art.

Figure 2:
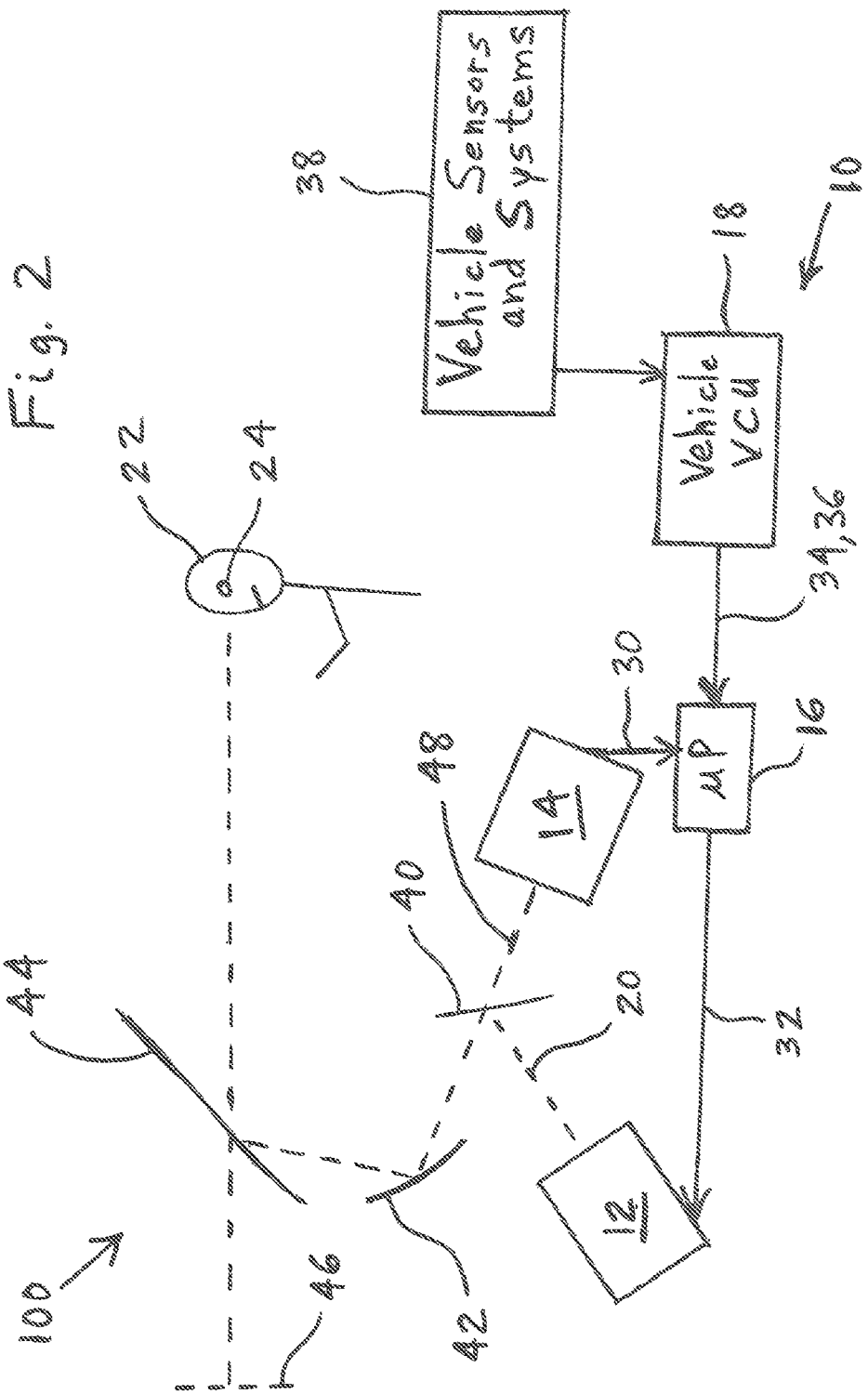
FIG. 2 is a schematic diagram of an AR HUD arrangement including the AR HUD system of FIG. 1.

FIG. 2 illustrates an AR HUD arrangement 100 of FIG. 1 including AR HUD system 10. Projector 12 may be in the form of a HUD picture generation unit. AR HUD arrangement 100 further includes vehicle sensors and systems 38, a dichroic mirror 40, a freeform mirror 42, and a vehicle windshield 44.

Visible light from HUD picture generation unit 12 reflects from dichroic mirror 40, reflects from freeform mirror 42, and reflects from the windshield 44 to be seen by the driver as a virtual image 46 outside of windshield 44.

Infrared light 48 from driver monitor system 14 passes through dichroic mirror 40, reflects from freeform mirror 42, and reflects from windshield 44 to illuminate the driver's face. Reflected IR from the driver's face retraces the same path: reflects from windshield 44, reflects from freeform mirror 42, and passes through dichroic mirror 40 to be imaged by a camera (not shown) in driver monitor system 14. Driver monitor system 14 outputs the eye position to processor 16.

Vehicle video control unit 18 creates augmented reality graphics that does not take the driver's head position into account. The video from vehicle video control unit 18 passes to processor 16, along with information that describes the average distance from driver 22 to the augmented reality object(s) in various zones in virtual image 46. Processor 16 combines the input video, the driver eye position, and the average distance from driver 22 to the virtual object(s) to produce a video stream to HUD picture generation unit 12 that correctly includes parallax.

In an alternate embodiment (not shown), the driver monitor system is positioned behind the freeform mirror, which has a dichroic coating. The flat dichroic mirror shown in FIG. 2 is removed, and the HUD picture generation unit is placed in the position of driver monitor system as it is shown in FIG. 2.

In one embodiment, the driver's head is tracked in sequential frames and the collected data is used to predict the driver's head position, thereby providing an improved virtual image and avoiding a perception of latency. The relative velocity of the driver's eye point is calculated from the measured change in driver's eye point between two or more points, and the frame rate at which the camera shutter operates.

In one embodiment, let T1 and T2 be two sequential times at which the DMS system measures d1 and d2, respectively, as the two-dimensional vector characteristic of the driver's transverse eye position. Let OD1 and OD2 be the distance from the driver to the virtual object at times T1 and T2, respectively. Let T2 be the time of the most recent measurement, and T3 be the time at which the image will be presented to the driver. The transverse velocity of the eye position is: $VT=(d2-d1)/(T2-T1)$. The longitudinal velocity of the eye position is: $VOD=(OP2-OP1)/(T2-T1)$. The predicted value of d at time T3 is: $d3=d2+(T3-T2)*VT$. The predicted value of OD at time T3 is: $OD3=OD2+VOD*(T3-T2)$.

The processor uses d3 and OP3 to update the appearance of the virtual object (instead of d2 and OP2) to provide the perception that the virtual object is locked to the scene in front of the driver. It is possible to use the measured head position at more than two sequential times to estimate velocity, so as to minimize the driver's perception of jitter in the virtual image.

Figure 3:
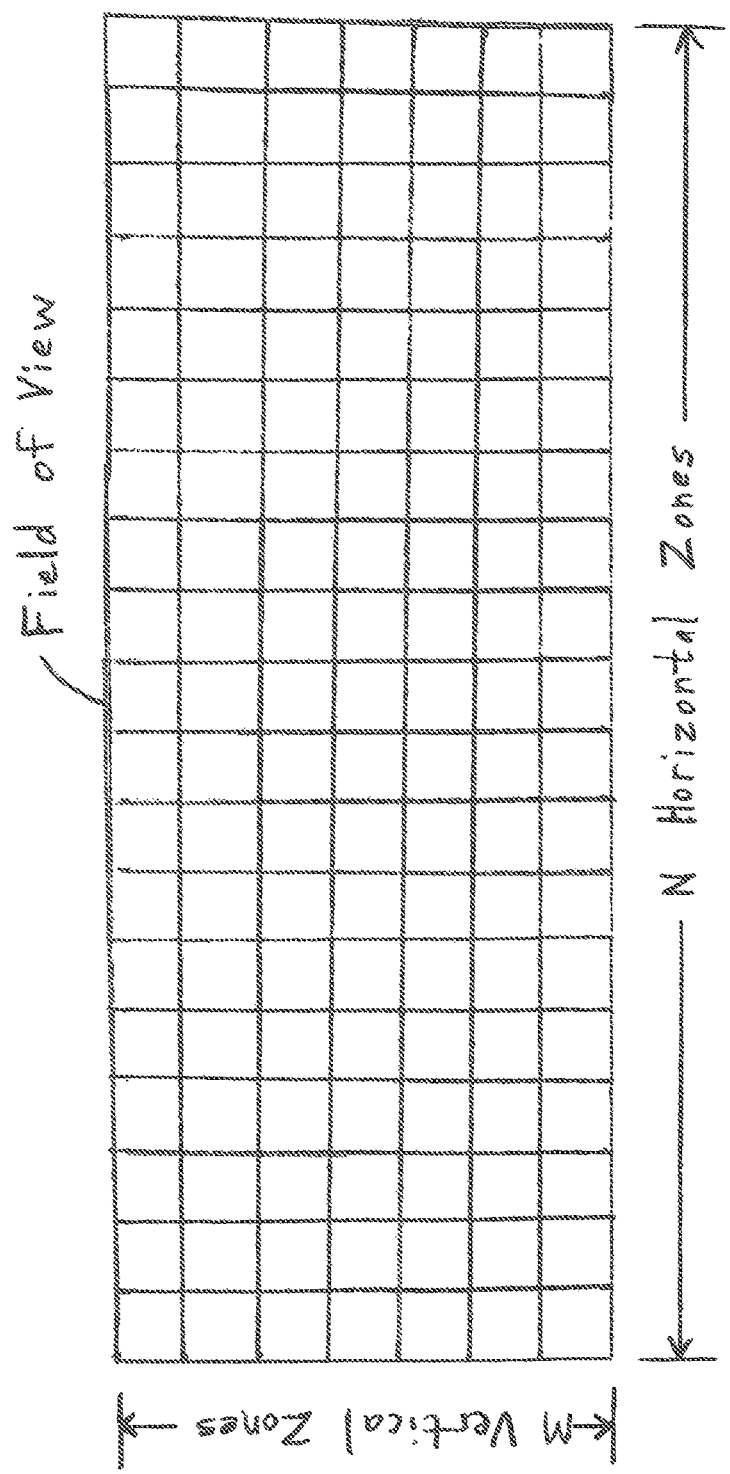
FIG. 3 is a plan view of one embodiment of a field of view of a virtual image of the present invention.

As an example of how the invention can be implemented, let the field of view of the virtual image be rectangular, with angular dimensions H×V. As an example, H is divided into N zones and V is divided into M zones, where N and M are integers >0, as shown in FIG. 3, and where N=19 and M=7. The average distance to the virtual objects in each zone is determined. For example, the average distance to the virtual objects in zone(J, K) is OP(J, K). Then, for pixels in zone(J, K), the value of OP used in Eq. (1) is OP(J, K).

FIG. 3 illustrates how the field of view is divided into zones. The average object distance is determined for each zone. The average object distance for each zone is communicated from the video control unit to the processor, and is used in the determination of the transformed image for that zone. The field of view and the zones do not need to be rectangular.

In one embodiment, in zone(J, K), for example, there are QP total pixels that display a virtual object. Let QPL be an index that labels the pixels from 1 to QP. In one embodiment, the average value OP(J, K)=[OP (QPL=1)+ . . . +OP (OPL=QP)]/QP. In a second embodiment, the points are weighted by (1/distance) in computing the average, to conform to the eye's perception. Thus, the average value:

$$OP(J,K)=1/\{[1/OP(QPL=1)+ \ldots +1/OP(QPL=QP)]/QP]\}$$

Figure 4:
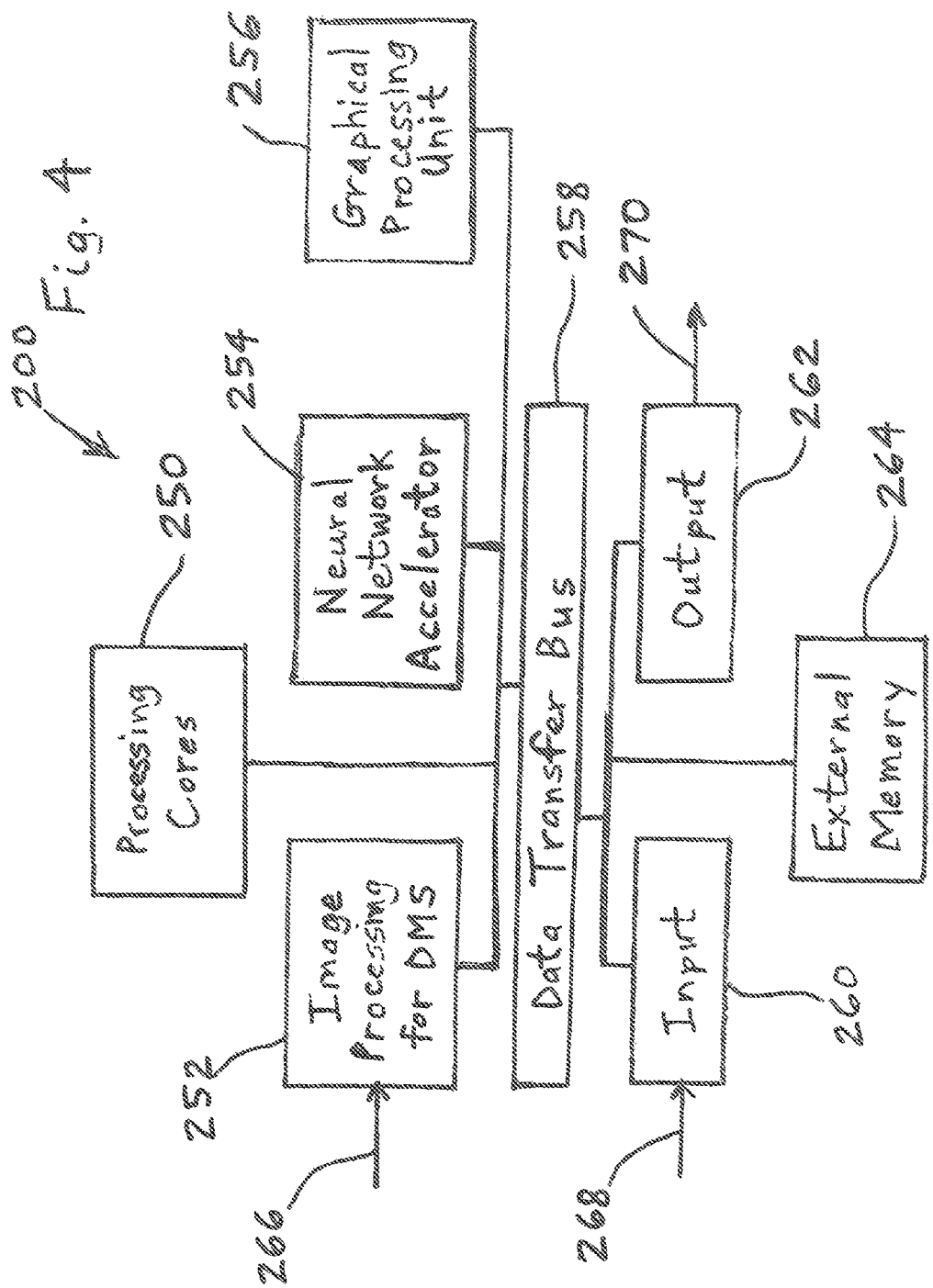
FIG. 4 is a block diagram of one embodiment of an AR HUD vision processing arrangement of the present invention.

As a specific embodiment, this invention can be implemented using an NXP S32V vision processor as shown in FIG. 4. The NXP S32V device is available from NXP Semiconductor of Eindhoven, The Netherlands. FIG. 4 illustrates an AR HUD vision processing arrangement 200 including processing cores 250, an image processing block 252 for the driver monitoring system (DMS), a neural network accelerator 254, a graphical processing unit 256, a data transfer bus 258, video input block 260, a video output block 262, and an external memory 264. Image processing block 252 receives data 266 from an IR camera (not shown). As indicated at 268, video input block 260 receives video input from the VCU and distance information on a backchannel. Video output block 262 transmits video output 270 to a HUD picture generation unit (not shown).

AR HUD vision processing arrangement 200 inputs video and distance information from the vehicle VCU, and outputs video to the HUD picture generation unit. In the example embodiment shown, the image processing for the infrared camera and the processing to determine the location of a point characteristic of the driver's eyes is also integrated. In one embodiment, the system shown is implemented with an NXP S32V vision processing device.

An alternative to the present invention is to use the driver eye position information in the process of creating the augmented reality graphics. A benefit of the present invention is that it accommodates existing electrical architectures. Moreover, in one application, the content is pre-recorded video, and thus the eye position information must be added at the display according to the present invention.

The inventive process of adding parallax to a video stream may be used for other display applications, not just for an augmented reality head up display. For example, it may be used for entertainment video, such as movies, to make it appear that near and far objects move as expected as the viewer moves their head. It may also be used with a transparent display to show virtual objects behind the transparent display that exhibit the appropriate parallax effect as the viewer moves their head.

The invention may provide compensation within the HUD for the driver's eye position. With a given HUD architecture, the invention enables the HUD itself to compensate for the effect of driver eye position, rather than the eye position being compensated for during the creation of the graphics.

Figure 5:
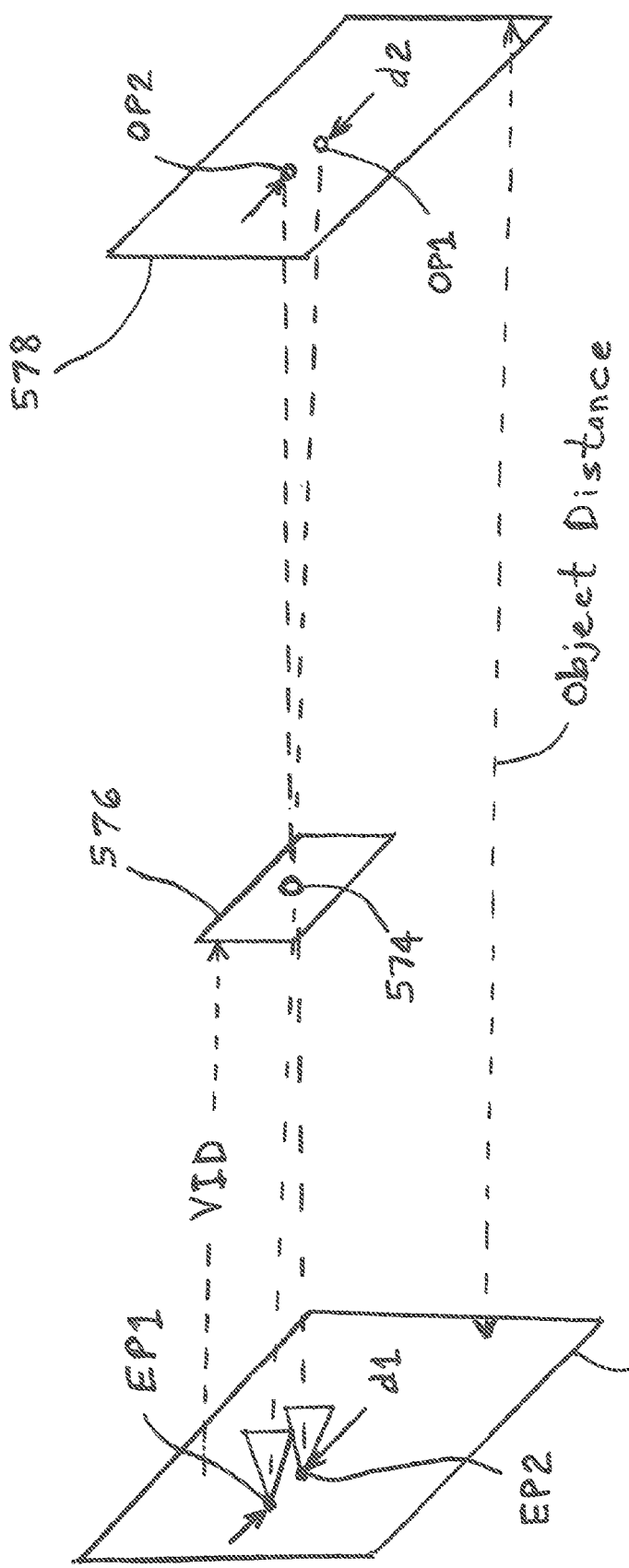
FIG. 5 is a schematic diagram illustrating the relationship between the eyebox and the virtual image according to one embodiment of the present invention.

The relationship between the driver eye position and the perceived indicator position at the object is illustrated in FIG. 5. Assume that at first the driver's eye is at the center of an eyebox 572 at point EP1, and a point 574 is created at virtual image 576 so it appears at the correct location relative to a real object at distance Object Distance. Next assume that the driver moves his head such that the driver's eye is displaced by vector d1 in eyebox 572. The projected point 574 at virtual image 576 stays fixed. The virtual point appears to be displaced by vector d2 in the plane of the projected virtual image 578.

To compensate, so the virtual object appears to be at the correct location given the new eye location, the projected point in the virtual image needs to move so at the object distance, the virtual point is displaced −d2. With reference to the diagram of FIG. 5:

$$d2=-d1(\text{Object Distance}-VID)/VID$$

The displacement on the virtual image to reverse this displacement is:

$$d3=-d2(VID)/(\text{Object Distance})=d1(\text{Object Distance}-VID)/(\text{Object Distance})$$

This approach works if there is only one virtual object, or if all virtual objects are at the same distance. There is a need to know what the Object Distance is. If there are multiple virtual objects at different distances, the compensation can only be accurate for one Object Distance.

Figure 6:
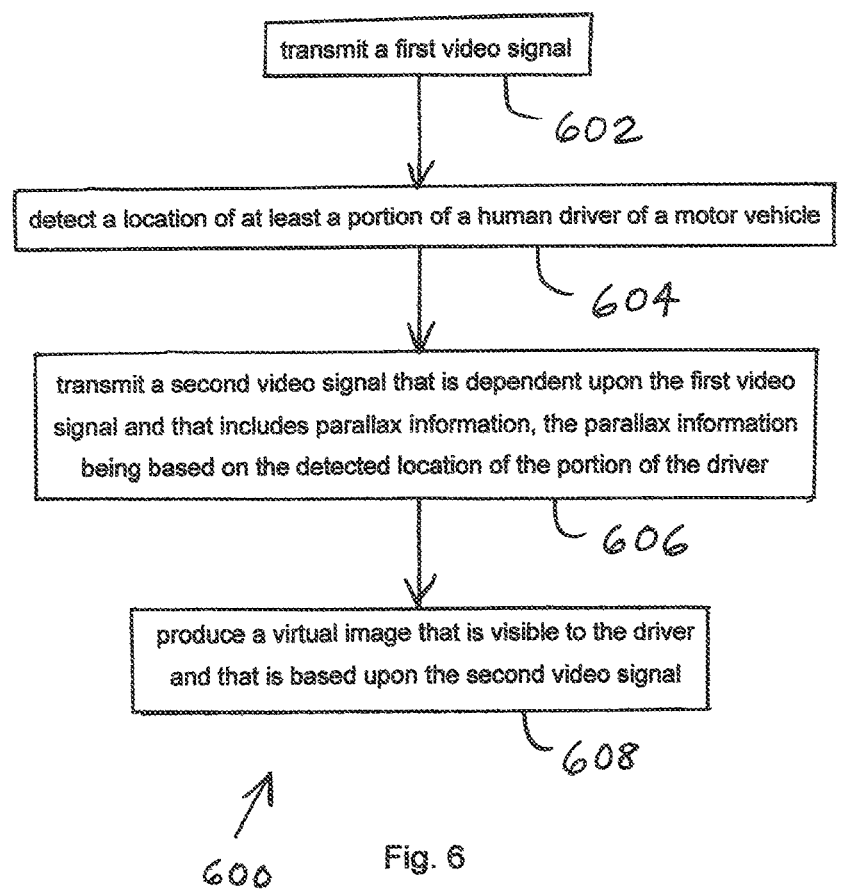
FIG. 6 is a flow chart of one embodiment of a method of the present invention for presenting visual information to a human driver in a motor vehicle.

FIG. 6 illustrates one embodiment of a method 600 of the present invention for presenting visual information to a human driver in a motor vehicle. In a first step 602, a first video signal is transmitted. For example, vehicle video control unit 18 may transmit a video stream or signal 34 of graphics without parallax to processor 16.

Next, in step 604, a location of at least a portion of the human driver of the motor vehicle is detected. For example, driver monitor system 14 may determine the position or location of one or both eyes 24 of driver 22 in three-dimensional space.

In a next step 606, a second video signal that is dependent upon the first video signal and that includes parallax information is transmitted. The parallax information is based on the detected location of the portion of the driver. For example, based on the location of one or both eyes 24, processor 16 may include or add parallax information in a video signal 32 that is dependent upon signal 34 and that is transmitted to projector 12.

In a final step 608, a virtual image that is visible to the driver and that is based upon the second video signal is produced. For example, visible light from HUD picture generation unit 12, and that is based upon signal 32, reflects from dichroic mirror 40, reflects from freeform mirror 42, and reflects from the windshield 44 to be seen by the driver as a virtual image 46 outside of windshield 44.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A head up display arrangement for a motor vehicle, comprising:
   a source of a first video signal;
   a driver monitor system configured to detect a location of at least a portion of a human driver of the motor vehicle;
   an electronic processor communicatively coupled to the first video signal source and to the driver monitor system, the electronic processor being configured to produce a second video signal that is dependent upon the first video signal and that includes parallax information, the parallax information being based on the detected location of the portion of the driver, wherein the parallax information is dependent upon an estimate of where the portion of the human driver will be at a future point in time; and
   a head up display projection device configured to produce a virtual image that is visible to the driver and that is based upon the second video signal.

2. The arrangement of claim 1, wherein the first video signal lacks parallax information.

3. The arrangement of claim 1, wherein the driver monitor system transmits infrared energy toward the driver and detects the infrared energy after the infrared energy has been reflected off of the driver.

4. The arrangement of claim 1, wherein the driver monitor system is configured to detect a location of an eye of a human driver.

5. The arrangement of claim 1, wherein the virtual image includes a plurality of zones, the parallax information being different for each of the zones.

6. The arrangement of claim 5, wherein the second video signal is dependent upon a plurality of perceived distances between the driver and respective virtual objects in respective ones of the zones.

7. The arrangement of claim 6, wherein a respective position of each of the virtual objects in the virtual image that is based upon the second video signal is translated relative to a corresponding position of the virtual object in a hypothetical virtual image that is based upon the first video signal.

8. The arrangement of claim 1, wherein the parallax information is dependent upon a perceived position of the virtual image.

9. A method for presenting visual information to a human driver in a motor vehicle, the method comprising:
   transmitting a first video signal;
   detecting a location of at least a portion of the human driver of the motor vehicle;
   predicting where the portion of the human driver will be at a future point in time;
   transmitting a second video signal that is dependent upon the first video signal and that includes parallax information, the parallax information being based on the detected location of the portion of the driver and the prediction of where the portion of the human driver will be at a future point in time; and
   producing a virtual image that is visible to the driver and that is based upon the second video signal.

10. The method of claim 9, wherein the first video signal lacks parallax information.

11. The method of claim 9, wherein the detecting step includes transmitting infrared energy toward the driver and sensing the infrared energy after the infrared energy has been reflected off of the driver.

12. The method of claim 9, wherein the detecting step includes detecting a location of an eye of the human driver.

13. The method of claim 9, wherein the virtual image includes a plurality of zones, the parallax information being different for each of the zones.

14. The method of claim 13, wherein the second video signal is dependent upon a plurality of perceived distances between the driver and respective virtual objects in respective ones of the zones.

15. The method of claim 14, wherein a respective position of each of the virtual objects in the virtual image that is based upon the second video signal is translated relative to a corresponding position of the virtual object in a hypothetical virtual image that is based upon the first video signal.

16. The method of claim 9, wherein the parallax information is dependent upon a position of the virtual image as perceived by the driver.

17. The method of claim 9, wherein the parallax information is dependent upon an estimate of where a portion of a head of the human driver will be at a future point in time.

18. A head up display arrangement for a motor vehicle, comprising:
   a source of a first video signal;
   a dichroic mirror;
   a driver monitor system configured to:
      emit infrared energy through the dichroic mirror such that the infrared energy is reflected off of a human driver of the motor vehicle;
      receive the reflected infrared energy after the infrared energy is reflected off of a human driver; and
      detect a location of at least a portion of a human driver of the motor vehicle based upon the received infrared energy;
   an electronic processor communicatively coupled to the first video signal source and to the driver monitor system, the electronic processor being configured to produce a second video signal that is dependent upon the first video signal and that includes parallax information, the parallax information being based on the detected location of the portion of the driver and an estimate of where the portion of the human driver will be at a future point in time; and
   a head up display projection device configured to emit a light field that is reflected off of the dichroic mirror to thereby produce a virtual image that is visible to the driver and that is based upon the second video signal.

19. The arrangement of claim 18, wherein the first video signal lacks parallax information.

20. The arrangement of claim 18, wherein the driver monitor system is configured to detect a location of an eye of a human driver.

* * * * *